(12) United States Patent  
Miller, Sr. et al.

(10) Patent No.: US 12,347,262 B2  
(45) Date of Patent: Jul. 1, 2025

(54) PROJECTION DISPLAY SYSTEM FOR GAMING DEVICE

(71) Applicant: Aristocrat Technologies, Inc., Las Vegas, NV (US)

(72) Inventors: Charles Miller, Sr., Henderson, NV (US); Rajendrasinh Jadeja, Las Vegas, NV (US); Michael Baum, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 186 days.

(21) Appl. No.: 17/491,203

(22) Filed: Sep. 30, 2021

(65) Prior Publication Data

US 2022/0230505 A1    Jul. 21, 2022

Related U.S. Application Data

(60) Provisional application No. 63/138,080, filed on Jan. 15, 2021.

(51) Int. Cl.

| | |
|---|---|
| *G07F 17/32* | (2006.01) |
| *A63F 13/2145* | (2014.01) |
| *A63F 13/24* | (2014.01) |
| *A63F 13/25* | (2014.01) |

(52) U.S. Cl.  
CPC ...... *G07F 17/3211* (2013.01); *A63F 13/2145* (2014.09); *A63F 13/24* (2014.09); *A63F 13/25* (2014.09); *G07F 17/3209* (2013.01); *G07F 17/3216* (2013.01); *G07F 17/3223* (2013.01); *G07F 17/323* (2013.01); *A63F 2300/1075* (2013.01)

(58) Field of Classification Search  
CPC ............ G07F 17/3211; G07F 17/3209; G07F 17/3216  
See application file for complete search history.

(56) References Cited

U.S. PATENT DOCUMENTS

| | | |
|---|---|---|
| 6,175,679 B1 | 1/2001 | Veligdan |
| 9,126,113 B2 | 9/2015 | Johnson |
| 9,875,599 B2 | 1/2018 | Onitsuka |
| 10,126,636 B1* | 11/2018 | Heppler ............... G03B 21/142 |
| 10,614,653 B2 | 4/2020 | Yukimura |
| 2009/0191946 A1* | 7/2009 | Thomas .............. G07F 17/3209 463/20 |
| 2011/0263326 A1* | 10/2011 | Gagner ................. G07F 17/322 463/34 |

(Continued)

FOREIGN PATENT DOCUMENTS

WO     2010058207 A1    5/2010

*Primary Examiner* — Jasson H Yoo  
(74) *Attorney, Agent, or Firm* — Greenberg Traurig, LLP

(57) ABSTRACT

A gaming device includes a main cabinet defining an opening, a game controller within the main cabinet and configured to control games available for play on the gaming device, and a projection display system. The projection display system includes a display member positioned over the opening and defining a display surface, a projector positioned within the main cabinet and configured to output light for providing a graphical output at the display surface, and an optical element positioned along a light path between the projector and the display member and configured to redirect the light from the projector toward the display surface.

20 Claims, 9 Drawing Sheets

(56) References Cited

U.S. PATENT DOCUMENTS

| | | | |
|---|---|---|---|
| 2011/0269543 A1* | 11/2011 | Johnson | G07F 17/3209 463/37 |
| 2013/0203490 A1* | 8/2013 | Hilbert | G07F 17/3218 463/30 |
| 2013/0303281 A1* | 11/2013 | Argiro | A63F 13/428 463/31 |
| 2018/0025575 A1* | 1/2018 | Yukimura | H04N 9/3194 463/31 |
| 2018/0108207 A1* | 4/2018 | Lyons | G07F 17/3211 |
| 2019/0102967 A1* | 4/2019 | Lyons | G07F 17/3206 |
| 2020/0105087 A1* | 4/2020 | Ikeda | G07F 17/322 |
| 2020/0225784 A1* | 7/2020 | Hwangbo | A63F 13/2145 |

* cited by examiner

PROJECTION DISPLAY SYSTEM FOR GAMING DEVICE

This application is a nonprovisional of, and claims the benefit under 35 U.S.C. § 119(e) of, U.S. Provisional Patent Application No. 63/138,080, filed Jan. 15, 2021, the contents of which are incorporated herein by reference as if fully disclosed herein.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

The embodiments described herein may include a gaming device that includes a main cabinet that defines an opening. The gaming device may further include a game controller within the main cabinet and configured to control games available for play on the gaming device. The gaming device may further include a projection display system that includes a display member, a projector, and an optical element. The display member may be positioned over the opening defined by the main cabinet, and may define a display surface. The projector may be positioned within the main cabinet and may be configured to output light for providing a graphical output at the display surface. The optical element may be positioned along a light path between the projector and the display member and may be configured to redirect the light from the projector toward the display surface.

DETAILED DESCRIPTION

The embodiments herein are generally related to a projection display system for a gaming device. The projection display system may include a projector positioned within the gaming device and adapted to project content that is viewable on a display surface of a display member. The projection display system may optionally include one or more optical elements configured to modify an output of the projector for proper presentation on the display surface. Additionally or alternatively, the projection display system may include one or more components for sensing touch or force inputs to the display surface.

The projector may project an image on the display member either directly or via an optical element (e.g., by reflection or refraction). The display member may include one or more features that result in the image being presented on the display surface. In some cases, the display member includes a refractive pattern, a film, or other coating or treatment along a rear surface of the display member such that the image is presented on the display surface (e.g., rather than simply being projected through the display surface). In some cases, the image may be a three-dimensional or holographic image.

The projection display systems described herein may provide numerous advantages over traditional monitor-based displays for gaming devices. For example, not including a traditional display (e.g., an LCD or LED display) in a gaming device may reduce the cost to produce the gaming device. As another example, the projection display system may be less susceptible to damage (e.g., impact damage, damage caused by liquid or other intrusions, and the like), because the display member is more durable than a traditional display, and because more components can be positioned within the gaming device and further away from the display surface or other external components of the gaming device. This may reduce repair and/or maintenance costs over the life of the gaming device.

Figure 1:
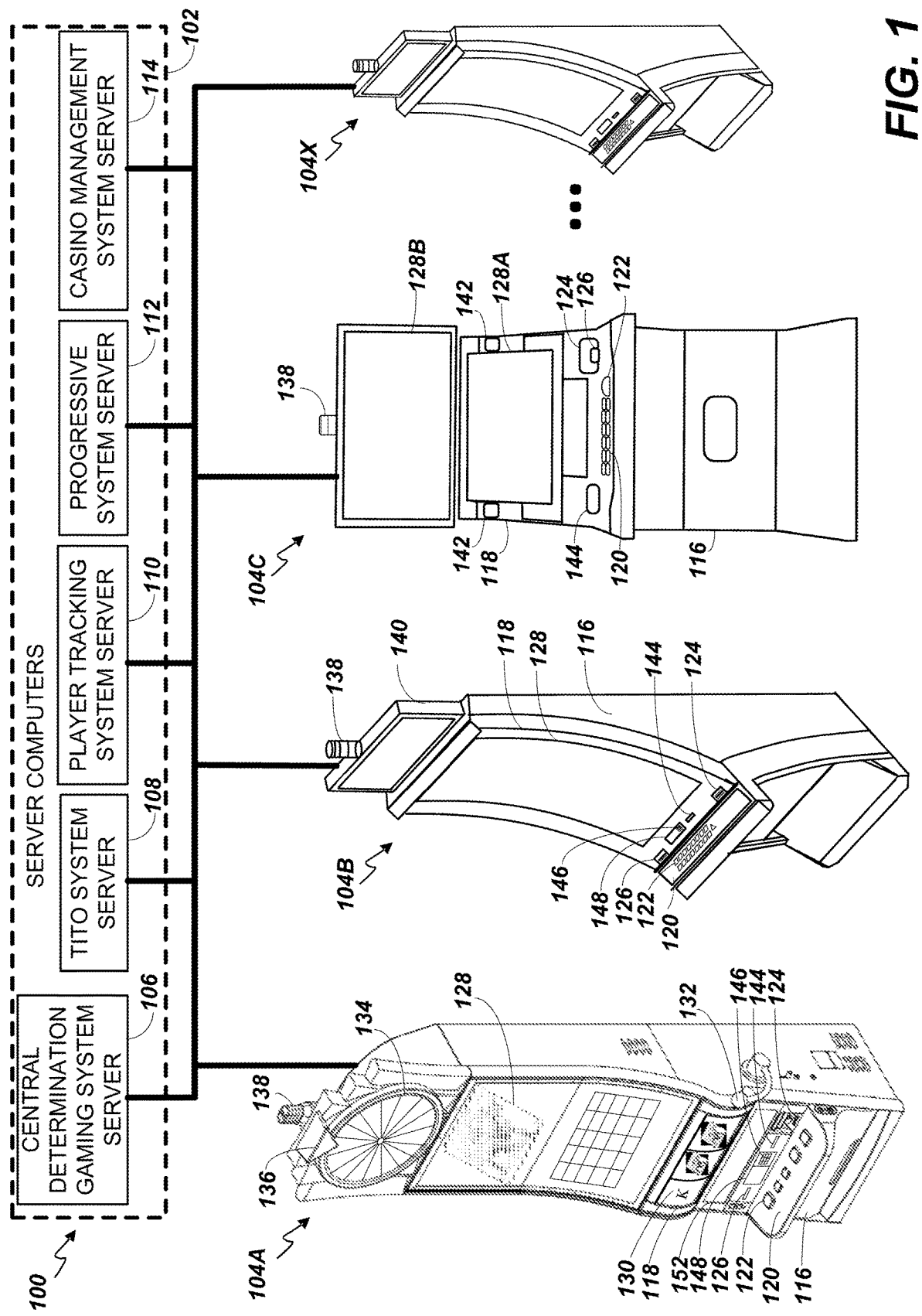
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
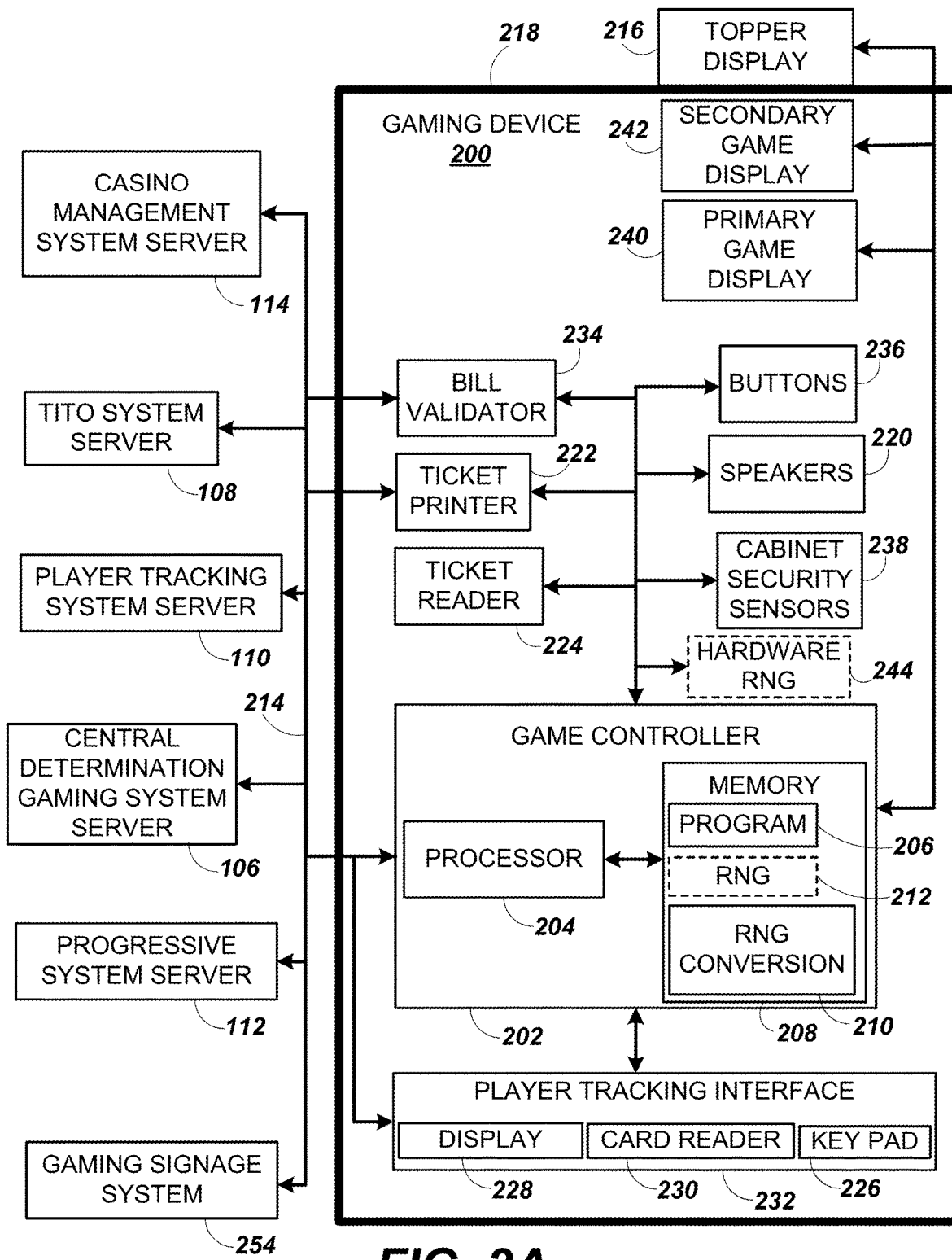
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics)

described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
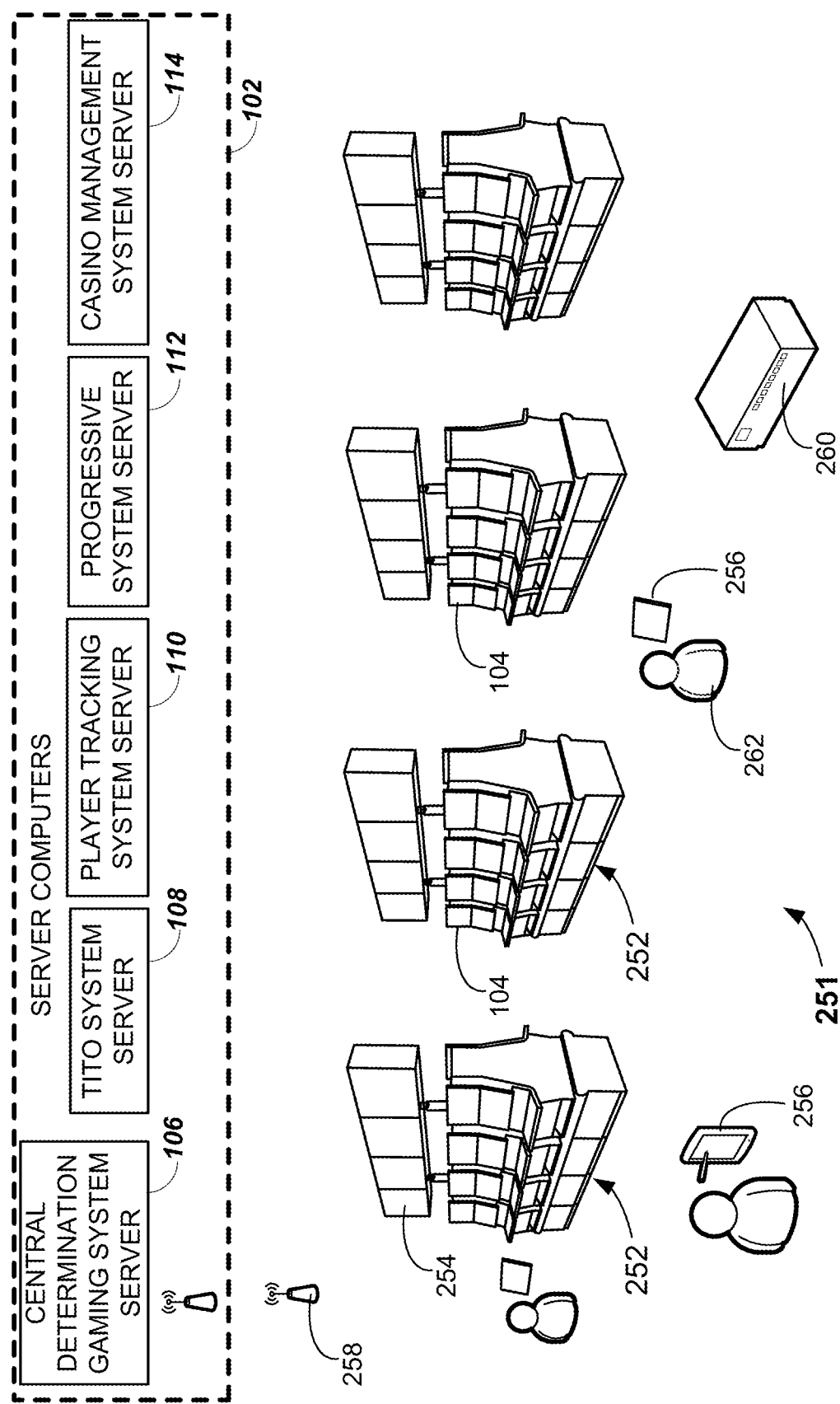
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
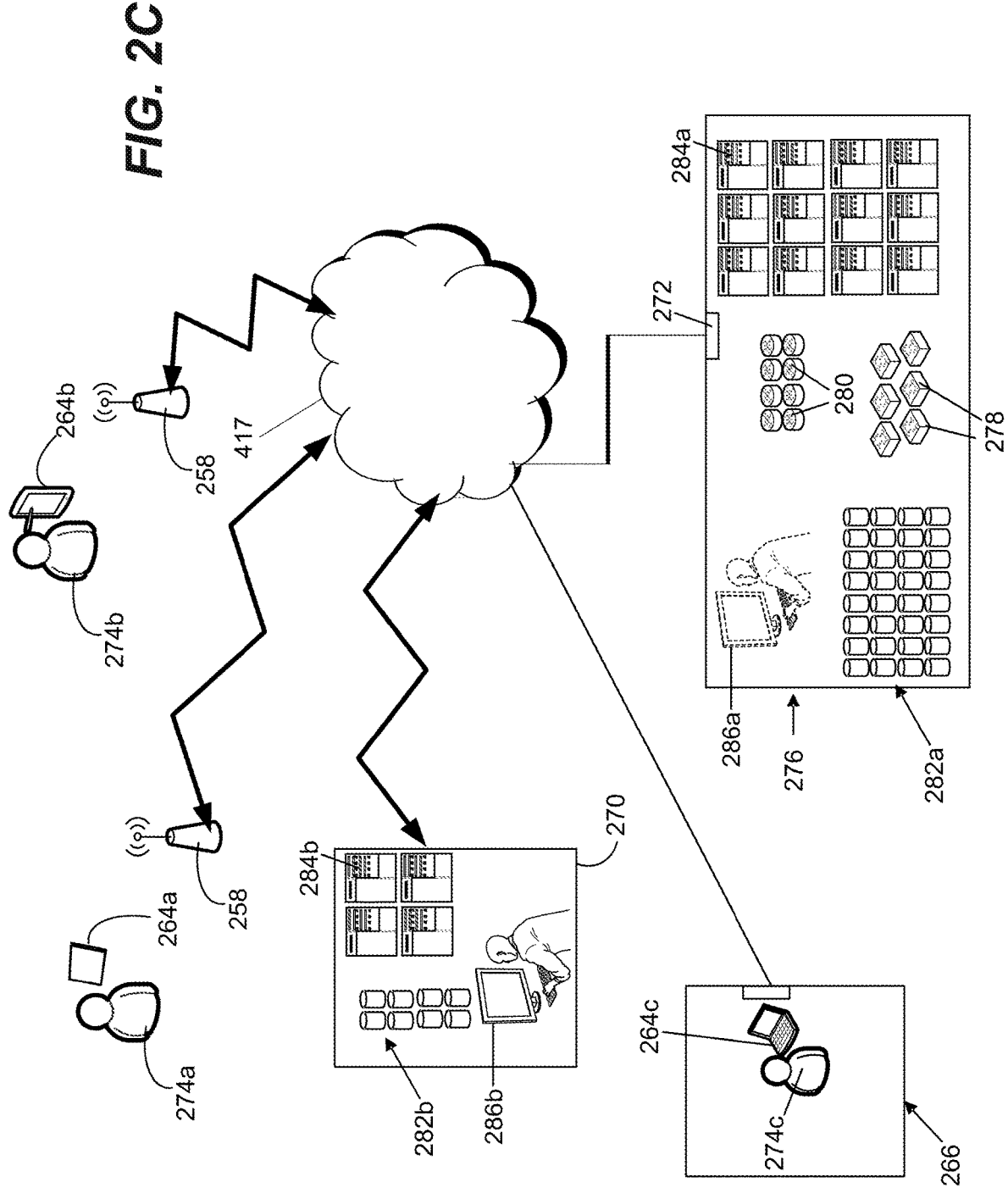
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3A:
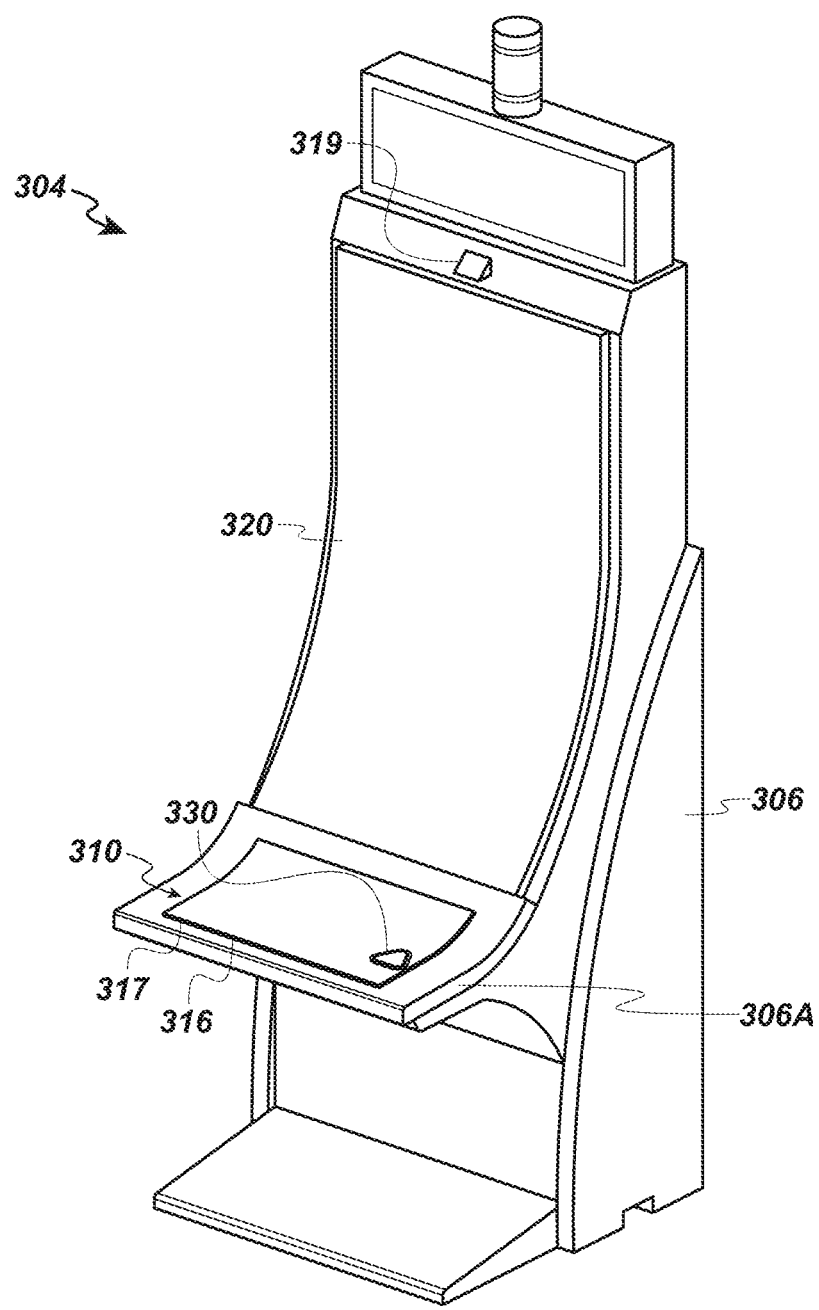
FIG. 3A illustrates an example gaming device that includes a projection display system.

FIG. 3A illustrates an example gaming device 304 that includes a projection display system 310. The gaming device 304, a portion of which is shown in FIG. 3A, may be similar to the gaming devices discussed herein (e.g., gaming devices 104a, 104b, and 104c). The gaming device 304 may include a main cabinet 306, which houses a primary game display 320 and one or more secondary game displays (e.g., a display member 316 of the projection display system 310, a topper, etc.). In various embodiments, any of the primary or secondary game displays of the gaming device 304 may be part of a projection display system.

Figure 3B:
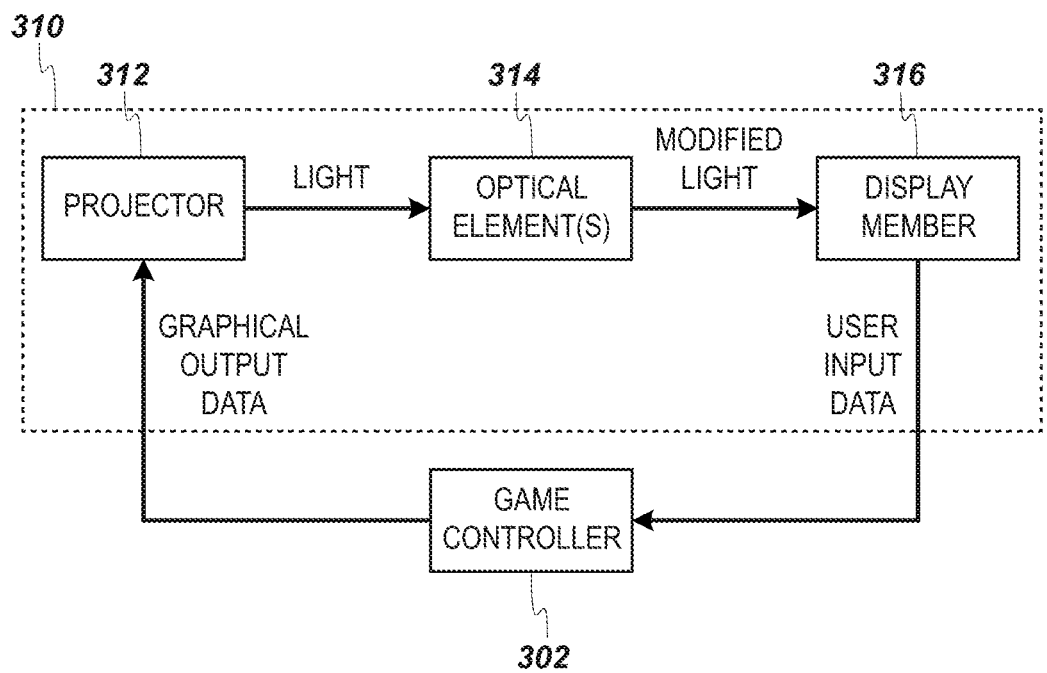
FIG. 3B is a functional block diagram of the example projection display system of FIG. 3A.

FIG. 3B is a functional block diagram of the example projection display system 310. As shown in FIG. 3B, the projection display system 310 may include a projector 312, a display member 316 defining a display surface, and one or more optical elements 314 positioned along a light path between the projector 312 and the display member 316. The projector 312 may output light, which produces a graphical output viewable at the display surface of the display member 316. The projector 312 may be positioned within the gaming device 304 such that the light output by the projector is viewable through (or on) the display member 316.

The projector 312 may output light in response to receiving graphical output data from a game controller 302 of the device 304. The graphical output data may correspond to graphical outputs regarding games or other content provided by the gaming device 304. The graphical output provided by the projection display system 310 may be a dynamic graphical output, meaning that the graphical output changes (e.g., graphical elements of the graphical output move) in response to user inputs and/or game conditions. The projector 312 may be capable of providing a graphical output that is greater than 300 nits, greater than 500 nits, greater than 750 nits, greater than 1000 nits, or more.

The optical element(s) 314 may modify the light output by the projector 312, resulting in modified light being provided to the display member 316. Examples of optical elements 314 include mirrors, prisms, lenses, and the like. In various embodiments, the physical structure of the gaming device 304 and/or the position of the display member 316 may require that the projector 312 be positioned such that there is not a direct path from the projector to the display member, and/or the projector outputs light at an angle that is not perpendicular to the display surface. For example, as shown in FIG. 3A, the display surface may be provided along a protruding portion 306A of the game cabinet 306, making it difficult to place a projector beneath the display surface. The optical element(s) 314 may modify the light such that the desired graphical output is provided on the display surface. In some cases, the optical element(s) 314 may include a mirror, prism, or other component configured to redirect the light output by the projector 312 toward the display member 316. This is discussed in more detail with respect to FIGS. 4 and 5. Additionally or alternatively, the optical elements 314 may include one or more lenses or other components that are configured to account for distortion of the graphical output that would otherwise be caused by the angle of the light output by the projector relative to the display surface, for example by performing reverse image distortion or a keystone adjustment.

As noted above, the graphical output may be viewable along the display surface of the display member 316. The display member 316 may be positioned in or over an opening defined in the gaming device 304 (e.g., an opening defined in the main cabinet 306). The display member 316 may be formed of any suitable materials or combination of transparent and/or translucent materials, including glass, polymers, and the like. The display member 316 (or the gaming device 304 more generally) may also include one or more coatings, films, textures, or other treatments that facilitate the display of graphical outputs on the display member 316. In some cases, the display member 316 is curved such that it conforms to and/or compliments a contour of the exterior surface of the gaming device 304. The curve of the display may be convex or concave with respect to the gaming device 304. In some cases, the entire display member 316 is curved. In some cases, the display member 316 includes a planar portion and a curved portion to conform to a contour of the exterior surface of the gaming device 304. The different portions may be different pieces, or different regions of a single piece.

In some cases, the projection display system 310 may include touch-sensing functionality such that the display member 316 may function as a touch screen display. For example, the projection display system 310 (or the gaming device more generally) may include a touch-sensing system 317 (FIG. 3A), which may include one or more touch-sensing layers and associated circuitry to detect touch inputs to the display member. The touch-sensing layers of the touch-sensing system may be transparent or highly light-transmissive so the graphical output that is projected by the projection display system 310 is visible on the display member and through the touch-sensing layers. The touch-sensing system may be a capacitive touch-sensing system that uses capacitive touch sensing techniques, in which case the touch-sensing layers may include one or more transparent electrode layers that are used to detect changes in capacitance due to proximity or contact of a user's finger or other input device on the display member 316. Electrode layers may also be used for other types of touch- and/or force-sensing systems, such as resistive touch sensing systems. In some cases, the touch sensing system may use infrared touch sensing techniques, in which case the touch-sensing layers may include optical layers to facilitate touch sensing functionality. The touch-sensing layers may be positioned on the top or bottom of the display member 316. For example, in some cases the touch-sensing layers are coupled to the bottom of the display member in the same general location and position as the film 419 in FIG. 4.

The touch-sensing system is an example input sensor for detecting inputs to the gaming device via the display member, but other input sensor systems or techniques may be used to detect inputs to the gaming device. For example, the projection display system 310 may include a spatial sensor (an example input sensor, which may include one or more cameras 319, FIG. 3A, or other spatial sensing systems) operable to detect inputs to the gaming device 304 and/or the projection display system 310. For example, the spatial sensor may detect hand gestures that are performed above (e.g., not in contact with) the display member 316. Additionally or alternatively, the spatial sensor may detect touch-based inputs applied to the display member 316. Regardless of the particular type of input sensing and the type of inputs that are sensed, the projection display system 310 may provide user input data regarding the inputs to the game controller 302. For example, locations of touch inputs applied to the display member 316 may be provided to the game controller 304. As another example, information about non-contact gestures (e.g., gesture start and end locations, finger or hand positions, gesture speeds or directions, etc.) may be provided to the game controller 304.

The inputs detected by the sensing system(s) (e.g., touch-sensing systems or spatial sensing systems) may correspond to graphical outputs provided by the projection display system 310, and the games provided by the gaming device 304 and/or the graphical output provided by the projection display system may be responsive to (e.g., change in response to) the inputs. In particular, the graphical output provided by the projection display system may include gameplay elements that appear, disappear, change, move or otherwise respond dynamically to the inputs detected on or near the display member 316. For example, the projection display system 310 may display graphical outputs corresponding to buttons or other affordances that initiate a gameplay feature or control some aspect of a game. When selected via a touch input, the buttons or other affordances may cause the graphical outputs (including optionally the buttons or affordances themselves) to change, move, animate, disappear, or the like. As another example, the projection display system 310 may display graphics corresponding to gameplay features (e.g., cards in a virtual card game, chips representing gaming credits, gameplay selections, etc.). The user may manipulate those graphics using non-contact gesture inputs, such as a waving or swiping a hand to retrieve chips, fold a hand of cards, deal cards, clear gameplay selections, or the like. Regardless of the type of input or the manner in which inputs are detected (e.g., touch-sensing systems, spatial sensors, etc.), the graphical outputs provided by the projection display system 310 on the display member 316 may be responsive to (e.g., change in response to) the inputs, and the manner in which they respond may be based on information about the inputs (e.g., locations, directions, gestures, etc., as determined by the sensing system(s)) and/or the particular gameplay of a given gaming device 304.

Returning to FIG. 3A, the gaming device 304 may include one or more buttons (e.g., button 330) for receiving inputs to the gaming device 304. The buttons may be mechanical buttons that depress to register an input. Additionally or alternatively, the buttons may detect inputs using capacitive sensing, strain sensing, thermoelectric sensing, resistive sensing, optical sensing, or the like. In some cases, one or more buttons may include a display for providing outputs. The outputs provided by the display may correspond to a function of the button. In addition to, or instead of, the button 330, the gaming device 304 may incorporate a different input element, such as a joystick, trackball, touchpad, switch, or the like. In some cases, the display member 316 of the projection display system 310 may at least partially surround one or more physical buttons or input devices (e.g., button 330). The graphical output provided at the display member 316 may at least partially surround one or more buttons or input devices. The graphical output may indicate a function of the one or more buttons or input devices. In some cases, the function of the one or more buttons or input devices may change during gameplay functions. In such cases, the graphical output provided at the display member 316 (and proximate the buttons or input devices) may dynamically change to indicate the current function of the buttons or input devices.

In some cases, the projection display system 310 may include one or more output devices for providing outputs to users. Outputs may include audio outputs (e.g., sounds), haptic outputs (e.g., vibrations), and/or visual outputs (e.g., graphical outputs or light outputs). In some cases, the projection display system 310 includes one or more haptic output devices (e.g., a haptic actuator), audio output devices (e.g., a speaker) and/or visual output devices (e.g., a display) for providing outputs. In some cases, the buttons of the gaming device 304 may provide haptic, audio, and/or visual outputs to a user. The projection display system 310 may additionally or alternatively include various internal components, including a processing unit, communication components, memory, audio output devices (e.g., speakers), visual output devices (e.g., lights) and the like.

As noted above, the projection display system 310 may provide numerous advantages over traditional monitor-based displays for gaming devices. For example, using a projection display system in place of a traditional display (e.g., an LCD or LED display) may reduce the cost to produce the gaming device. As another example, the projection display system 310 may be less susceptible to damage, because the display member 316 is more durable than a traditional display and the projector 312 may be positioned further from the exterior surfaces of the gaming device than a traditional display could. This may reduce repair and/or maintenance costs over the life of the gaming device.

As noted herein, the graphical output of the projection display system 310 may correspond to a game, or a portion of a game, presented by the gaming device 304. In various embodiments, the graphical output may relate to advertising, virtual player displays, a supplemental display of a gaming device (e.g., a topper or other supplemental display), or the like. In some cases, the graphical output of the projection display system 310 may be provided as part of an attract mode of the gaming device 304, in which the device attempts to attract users. In some cases, the attract mode includes attraction activities that are synchronized or otherwise coordinated with nearby gaming devices 304. In some cases, the projection display system 310 may present multiple different graphical outputs simultaneously. As an example, the projection display system 310 may display a picture-in-picture (PIP) mode in which advertisements, announcements, or other content is presented alongside game content.

As noted above, the primary display can be used to play a game (e.g., to show graphical output corresponding to the gameplay) or to show information regarding a game, while the secondary display can be used to play a sub-game, a bonus game, show payout information, provide additional or contextual information regarding the game on the primary display, and so on. The secondary display can show static information or information that is contextual/dynamic and related to the game (or information) on the primary display. Game pieces or other symbols can "move" between displays to enhance the gaming experience, attract attention, or the like. For example, a primary display and a secondary display may act as or appear to be two portions of a single display area.

As noted above, the gaming device 304 may be connected to one or more mobile gaming devices (e.g., mobile gaming device 256) that may be used to interact with the gaming device 304. The mobile gaming devices may be connected to the gaming device 304 using any suitable wired or wireless techniques, including Bluetooth, NFC, Wi-Fi, and other wired and wireless networks. In some cases, a mobile gaming device may be paired with the gaming device to facilitate communication therebetween. The gaming device 304 may include a pairing member (e.g., an NFC antenna or the like) beneath the display member 316, and the graphical output may correspond to the pairing process. For example, the graphical output may indicate a pairing position on the display surface corresponding to the pairing member, such as a position that a user should position a device to pair with the gaming device 304.

Figure 4:
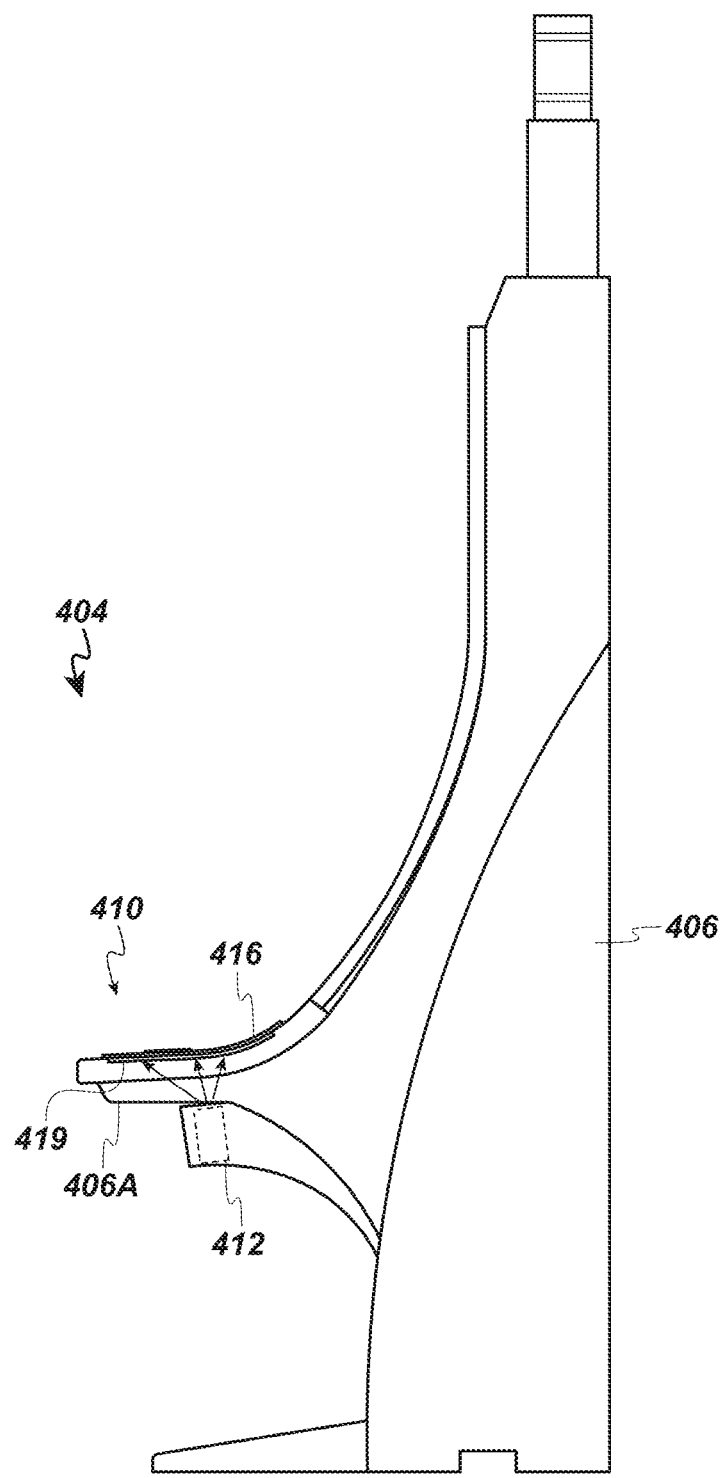
FIGS. 4-6 illustrate example projection display systems provided in gaming devices.

FIG. 4 illustrates an example projection display system 410 provided in a gaming device 404. The gaming device 404, a portion of which is shown in FIG. 4, may be similar to the gaming devices discussed herein (e.g., gaming devices 104a, 104b, 104c, and 304). The projection display system 410 may include a projector 412 and a display member 416. The display member 416 may be positioned along a protruding portion 406A of a main cabinet 406, and the projector 412 may be positioned beneath the display member 416. In some cases, the projector 412 is positioned in an enclosed portion of the gaming device 404 to exclude contaminants and otherwise reduce the chance of damage. The projector 412 may be a short throw projector that is capable of emitting light in a wide pattern such that it may be placed close (e.g., less than 6 inches, less than 4 inches, less than 2 inches, or the like) to the display member 416. The projection display system 410 may include one or more optical elements such as lenses, prisms, mirrors, reflector, or the like for modifying the output of the projector 412.

The projector 412 may project an image on the display member 416, either directly or via an optical element. In some cases, the image may be a three-dimensional or holographic image.

In some cases, a film 419 may optionally be included on the display member 416 or otherwise in the optical path between the projector 412 and the display member 416. As shown, the film 419 is coupled to a bottom surface (e.g., an interior surface) of the display member 416. The film 419 may be configured to enhance the appearance of the graphical outputs on the display member 416. For example, the film 419 may be configured to increase the contrast, brightness, color fidelity, or other optical parameter of the graphical output on the display member 416 (as compared to a display member 416 without the film 419). The film 419 may be bonded to the display member 416, such as via adhesive, electrostatic forces, or the like. The film 419 may be formed of or include glass, polymer, ceramic, or any other suitable material(s), and may include one single layer or multiple layers (of the same or different materials).

The film 419 may include or define optical features that produce the enhanced appearance of the graphical output described above. The optical features may take the form of a surface texture (e.g., a pattern or random distribution of protrusions, recesses, ridges, channels, or the like), internal features (e.g., voids, discontinuities, embedded materials), or the like. In some cases, the optical features of the film 419 may act as lenses to enhance the image forming ability of the display member 416. Stated another way, the optical features of the film 419 interact with the light from the projector 412 to display sharper, brighter, or otherwise higher-quality graphical outputs than may be achieved without the film. The film 419 may be transparent or translucent.

Instead of or in addition to the film 419, the display member 416 itself may include or define a refractive pattern, textured surface, or other optical features formed directly thereon. For example, a glass or polymer display member 416 may define a surface texture that enhances the quality of the graphical outputs displayed thereon. Such patterns or surfaces may be formed via etching (e.g., chemical etching, laser etching), mechanical processes, or the like.

In some cases, the display member 416 and/or the optional film 419 includes one or more optical coatings to enhance the graphical outputs displayed on the display member 416. For example, anti-reflective coatings, anti-glare coatings, filter coatings (e.g., to filter certain colors or wavelengths of light), anti-smudge coatings (e.g., oleophobic and/or hydrophobic coatings), or the like, may be applied to the display member and/or the film 419 to produce desired optical or graphical performance. Optical coatings may be applied or formed in various ways, including vacuum coating (e.g., chemical vapor deposition, plasma vapor deposition), dip coating, or the like. Optical coatings may also be or resemble films that are bonded to the display member 416.

Figure 5:
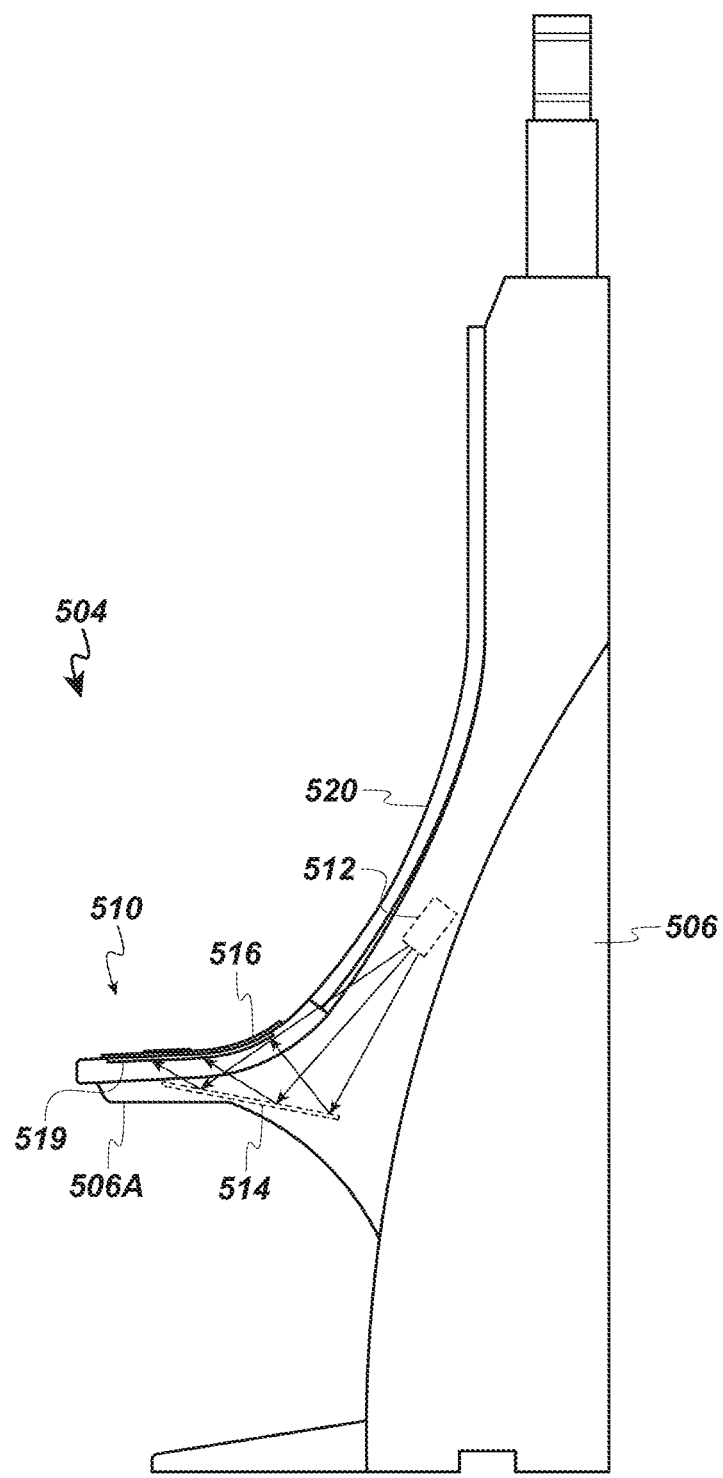

FIG. 5 illustrates an example projection display system 510 provided in a gaming device 504. The gaming device 504, a portion of which is shown in FIG. 5, may be similar to the gaming devices discussed herein (e.g., gaming devices 104a, 104b, 104c, 304, and 404). The projection display system 510 may include a projector 512 and a display member 516. The projection display system 510 may further include a mirror 514 (or other reflecting material or structure) positioned to reflect light emitted by the projector 512 toward the display member 516. The projection display system 510 may also include a film 519 on the display member 516 or otherwise in the optical path between the projector 512 and the display member 516. The film 519 may be the same as or similar to the film 419, and as such the discussion of the film 419 above applies equally to the film 519.

The display member 516 may be positioned along a protruding portion 506A of a main cabinet 506, and the projector 512 may be positioned in the main cabinet 506. In some cases, the projector 512 is positioned behind a primary display 520 of the gaming device 504. The mirror 514 (which is an example of an optical element) may allow an optical path between the projector 512 and the display member 516 to be extended and redirected such that the projector 512 need not be positioned directly beneath the display member 516. This may allow the projector 512 to be positioned within the main cabinet 506 to exclude contaminants and otherwise reduce the chance of damage.

Figure 6:
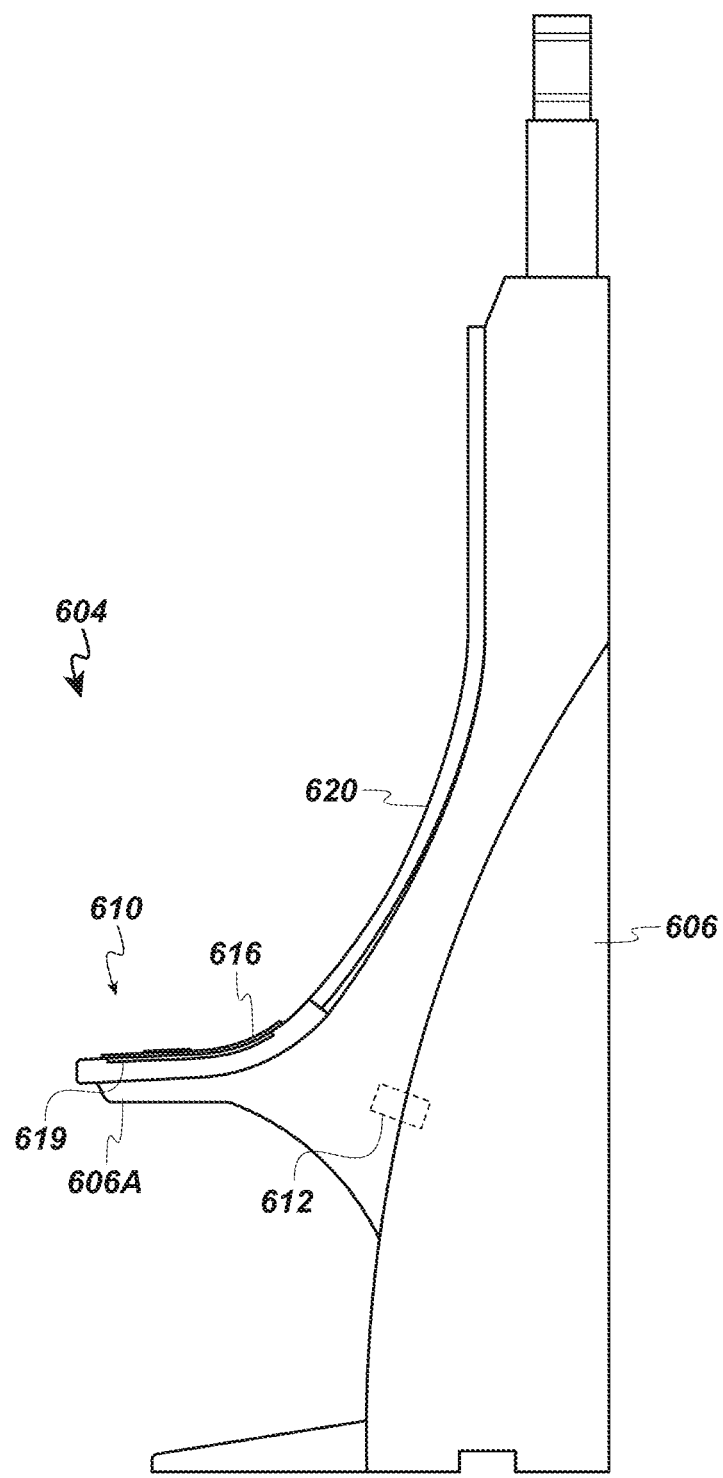

FIG. 6 illustrates an example projection display system 610 provided in a gaming device 604. The gaming device 604, a portion of which is shown in FIG. 6, may be similar to the gaming devices discussed herein (e.g., gaming devices 104a, 104b, 104c, 304, 404, and 504). The projection display system 610 may include a primary display 620, a projector 612, and a display member 616. The projector 612 may be positioned in the main cabinet 606 to exclude contaminants and otherwise reduce the chance of damage. In some cases, the projector 612 may be positioned such that light emitted by the projector 612 is incident on the display member 616 (positioned along a protruding portion 606a) at a non-perpendicular angle (e.g., less than 90 degrees, less than 60 degrees, less than 45 degrees, less than 30 degrees, or even less). The projection display system 610 may include one or more optical elements (such as lenses, prisms, mirrors, etc.) to account for distortion of the graphical output that may otherwise be caused by the angle of the light output by the projector relative to the display surface (or be caused by a different optical phenomena or the configuration of the projection display system 610), for example by performing reverse image distortion or a keystone adjustment.

The projection display system 610 may also include a film 619 on the display member 616 or otherwise in the optical path between the projector 612 and the display member 616. The film 619 may be the same as or similar to the film 419, and as such the discussion of the film 419 above applies equally to the film 619.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

What is claimed is:

1. A gaming device comprising:
    a main cabinet supporting a primary display and defining an opening;
    a game controller within the main cabinet and configured to control games available for play on the gaming device;
    a secondary projection display system comprising:
        a display member positioned over the opening and defining a display surface bounded by display edges, wherein at least a portion of the display surface is curved;
        a projector positioned within the main cabinet and configured to output light for providing a graphical output at the display surface;
        an optical element positioned along a light path between the projector and the display member and configured to redirect the light from the projector toward the display surface; and
        a touch-sensing system configured to detect a touch input to the display surface, wherein the graphical output is responsive to the touch input.

2. The gaming device of claim 1, wherein:
    the graphical output is a first graphical output;
    the gaming device is configured to pair with a mobile gaming device to receive inputs via the mobile gaming device; and the projector is further configured to output light for providing a second graphical output at the display surface, the second graphical output indicating a pairing position along the display surface at which the mobile gaming device may be paired with the gaming device.

3. The gaming device of claim 1, wherein the touch-sensing system comprises a capacitive touch-sensing system configured to detect touch inputs to the display surface.

4. The gaming device of claim 1, wherein the optical element comprises at least one of a mirror, a prism, or a lens.

5. The gaming device of claim 1, wherein:
the graphical output is a first graphical output;
the gaming device further comprises a button configured to receive inputs;
the display member at least partially surrounds the button; and
the projector is further configured to output light for providing a second graphical output at the display surface, the second graphical output at least partially surrounding the button.

6. The gaming device of claim 1, wherein the display member is transparent.

7. The gaming device of claim 1, wherein:
the optical element is a mirror; and
the mirror is configured to reflect the light output by the projector towards the display member.

8. The gaming device of claim 1, wherein:
a laterally central portion of the display surface is curved.

9. A projection display system for a gaming device, comprising:
a primary display; and
a secondary display separate from the primary display, the secondary display comprising:
a display member configured to define a display surface along an exterior surface of the gaming device, wherein the display surface is bounded by display edges and at least a portion of the display surface is curved;
a projector positioned within a main cabinet of the gaming device and configured to output light for providing a graphical output at the display surface;
an optical element configured to redirect the light from the projector toward the display surface; and
a touch-sensing system configured to detect a touch input to the display surface;
wherein:
the graphical output is configured to change in response to the touch input.

10. The projection display system of claim 9, wherein the optical element is configured to perform reverse image distortion on the light from the projector.

11. The projection display system of claim 9, wherein the optical element is a mirror configured to reflect the light from the projector toward the display surface.

12. The projection display system of claim 9, wherein:
a first portion of the display surface is curved; and
a second portion of the display surface is planar.

13. The projection display system of claim 12, wherein:
the display member comprises:
a curved portion defining the first portion of the display surface; and
a planar portion defining the second portion of the display surface.

14. The projection display system of claim 9, wherein the display member is at least one of transparent or translucent.

15. A gaming device, comprising:
a main cabinet comprising a main portion and a protruding portion;
a game controller within the main cabinet and configured to control games available for play on the gaming device;
a primary display in the main portion of the main cabinet;
a secondary projection display system comprising:
a display member defining a display surface along the protruding portion of the main cabinet, wherein the display surface is bounded by display edges and at least a portion of the display surface is curved;
a projector positioned within the main portion of the main cabinet and configured to output light for providing a graphical output at the display surface; and
a mirror positioned along a light path between the projector and the display member and configured to reflect the light from the projector toward the display surface; and
an input sensor configured to detect a user input with respect to the graphical output, wherein the graphical output is responsive to the user input.

16. The gaming device of claim 15, wherein:
the graphical output is a first graphical output;
the gaming device is configured to pair with a mobile gaming device to receive inputs via the mobile gaming device; and
the projector is further configured to output light for providing a second graphical output at the display surface, the second graphical output corresponding to a pairing process between the gaming device and the mobile gaming device.

17. The gaming device of claim 16, wherein the second graphical output indicates a pairing position along the display surface at which the mobile gaming device may be paired with the gaming device.

18. The gaming device of claim 15, wherein the display member comprises glass.

19. The gaming device of claim 15, wherein the input sensor is a touch-sensing system comprising transparent touch-sensing layer coupled to the display member.

20. The gaming device of claim 15, wherein:
the user input is a non-contact user input provided above the display member; and
the input sensor is a spatial sensor comprising a camera and is configured to detect the non-contact user input provided above the display member.

* * * * *